United States Patent [19]

Ogawa et al.

[11] 3,870,944

[45] Mar. 11, 1975

[54] SEMICONDUCTOR RECTIFIER APPARATUS

[75] Inventors: Kazuo Ogawa, Yokohama; Tetsuo Machii, Tokyo; Takahiro Sawano, Kawasaki; Katuhiko Kubota, Yokohama; Yoshiharu Yotumoto, Kawasaki, all of Japan

[73] Assignee: Tokyo-Shibaura Eelctric Co., Ltd., Kawaski-shi, Japan

[22] Filed: July 18, 1973

[21] Appl. No.: 380,401

[30] Foreign Application Priority Data
July 21, 1972 Japan.......................... 47-85344[U]

[52] U.S. Cl............................... 321/8 R, 310/68 D
[51] Int. Cl.............................................. H02m 7/20
[58] Field of Search.......... 310/68 R, 68 D; 321/8 R

[56] References Cited
UNITED STATES PATENTS

| | | | |
|---|---|---|---|
| 3,329,841 | 7/1967 | Binder et al. | 321/8 R |
| 3,422,339 | 1/1969 | Baker | 321/8 R |
| 3,527,972 | 9/1970 | Franz et al. | 310/68 D |
| 3,602,793 | 8/1971 | Grozinger | 310/68 X |
| 3,604,963 | 9/1971 | Tawara | 310/68 |
| 3,739,210 | 6/1973 | Bahlinger et al. | 310/68 D |
| 3,777,193 | 12/1973 | Buehner | 310/68 D |

FOREIGN PATENTS OR APPLICATIONS

| | | | |
|---|---|---|---|
| 1,613,026 | 10/1970 | Germany | 310/68 D |

*Primary Examiner*—R. N. Envall, Jr.
*Attorney, Agent, or Firm*—Oblon, Fisher, Spivak, McClelland & Maier

[57] ABSTRACT

The rectifier apparatus comprises first, second and third conductive films formed on one surface of a horseshoe shaped insulator plate, and are adapted to be connected with a three phase alternator, first and second DC output conductive plates formed on the opposite surface of the insulator plate, three pairs of main semiconductor elements mounted on the insulator plate and connected between the first, second and third conductive films and the first and second conductive plates so as to form a three phase full-wave rectifier, a fourth conductive film formed on one surface of the insulator plate, three auxiliary semiconductor elements received in the slots of the first output conductive plate and connected between the fourth conductive film and the first, second and third conductive films so as to form a three phase full-wave rectifier, and a DC output terminal of the full-wave rectifier mounted on the fourth conductive film.

2 Claims, 8 Drawing Figures

SEMICONDUCTOR RECTIFIER APPARATUS

This invention relates to a semiconductor rectifier apparatus including a circuit which is used as a three phase full-wave rectifier of a relatively large current capacity as well as a three phase full-wave rectifier of a relatively small current capacity and is especially suitable to be used in combination with an alternator mounted on a motorcar.

For the purpose of rectifying three phase AC voltages generated by an alternator mounted on a motorcar for charging a car mounted storage battery, a semiconductor rectifier assembly is generally used. A conventional rectifier assembly comprises six semiconductor rectifier elements which are connected in a bridge circuit, and two DC output terminals of the bridge circuit are connected to the positive and negative terminals of the storage battery. It is a recent trend to substitute a regulator utilizing semiconductor elements for the conventional mechanical type regulator utilized to provide constant voltage regulation of the car mounted alternator. Consequently, a field relay which has been utilized with the mechanical type regulator was changed to contactless type. To meet this tendency it was proposed to use two three phase rectifier circuits, one, of a relatively large capacity, and the other, of a relatively small capacity, the former being designed to supply a relatively large DC output to the battery, and the latter to supply a relatively small DC output to the field winding of the alternator. With such a design the rectifier elements comprising the three phase full-wave rectifier circuit of a large current capacity are mounted on the alternator, whereas the rectifier elements comprising the three phase rectifier circuit of a small current capacity are mounted on the constant voltage regulator of the alternator so that the rectifier assembly is bulky, complicated and is liable to be damaged by mechanical vibrations. In addition, as it is necessary to interconnect the rectifier elements with long wiring conductors, the cost of manufacturing increases and the chance of failure also increases.

Accordingly, it is an object of this invention to provide a new and improved semiconductor rectifier apparatus which is compact and simple in construction, inexpensive, shock proof and is particularly suitable to be combined with a car mounted alternator.

Another object of this invention is to provide an improved semiconductor rectifier apparatus of compact design including a three phase full-wave rectifier of a relatively large current capacity and a three phase full-wave rectifier of a relatively small current capacity.

According to this invention these and other objects can be accomplished by providing semiconductor rectifier apparatus comprising an insulator plate, first, second and third conductive films which are formed on one surface of the insulator plate and are adapted to be connected to receive respective phase currents of a three phase alternator, first and second DC output conductive plates applied onto the other surface of the insulator plate and are connected between the first, second and third conductive films and the first and second conductive plates so as to form a three phase full-wave rectifier, a fourth conductive film formed on said one surface of the insulator plate, three auxiliary semiconductor rectifier elements which are mounted on the insulator plate and are connected between the fourth conductive film and the first, second and third conductive films so as to form a three phase full-wave rectifier, the positive and negative main DC output terminals of the full-wave rectifier which are provided for the first and second conductor plates, respectively, and an auxiliary DC output terminal of the full-wave rectifier which is provided for the fourth conductive film.

This invention can be more fully understood from the following detailed description when taken in connection with reference to the accompanying drawings, in which.

Figure 1:
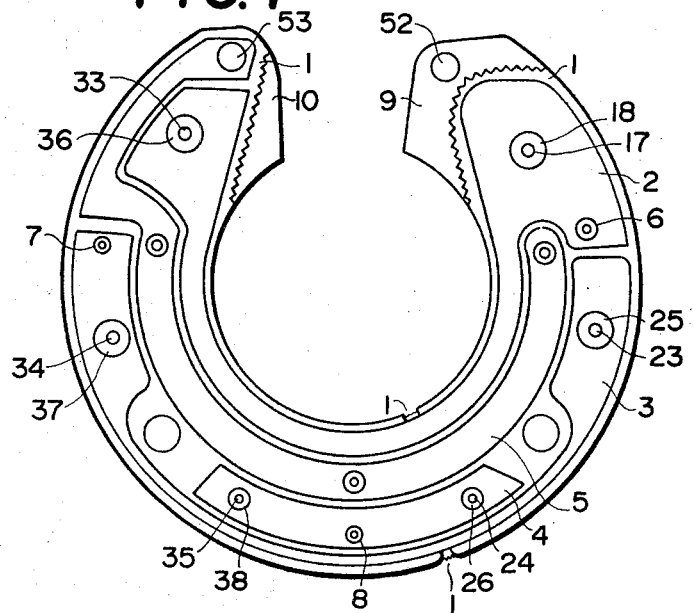
FIG. 1 shows a plan view of a semiconductor rectifier assembly constructed in accordance with the invention.
Figure 2:
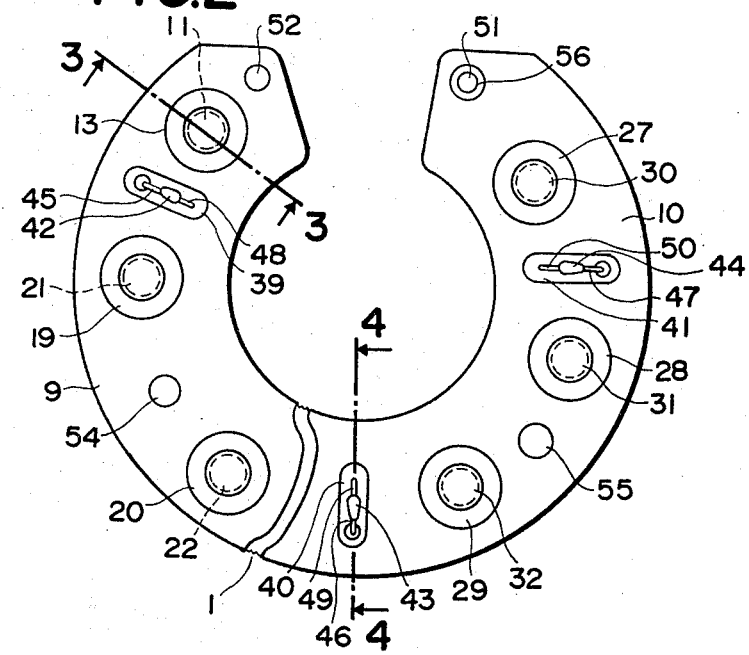
FIG. 2 shows a rear view of the assembly shown in FIG. 1.

As shown in FIGS. 1 and 2, spaced apart arcuate conductive films 2, 3, 4 and 5, each made of highly electroconductive metal such as copper and aluminium, are mounted on the upper surface of a horseshoe shaped insulated plate 1, preferably of a laminated construction. Conductive films 2, 3 and 4 are formed with AC input terminals 6, 7 and 8, respectively, which are adapted to be connected with the output terminals of a three phase alternator, not shown.

As shown in FIG. 2 arcuate electroconductive plates 9 and 10 made of a good conductor of heat and electricity, for example iron and aluminium, are mounted on the lower side of the horseshoe shaped insulator plate 1. The conductive plates 9 and 10 are constructed to have a relatively large thickness to increase the mechanical strength of the rectifier apparatus and to increase heat dissipation. As shown in FIG. 2, the opposed ends of the conductive plates 9 and 10 between which a portion of the insulator plate 1 is exposed are staggered to increase the mechanical strength of this portion.

Figure 3:
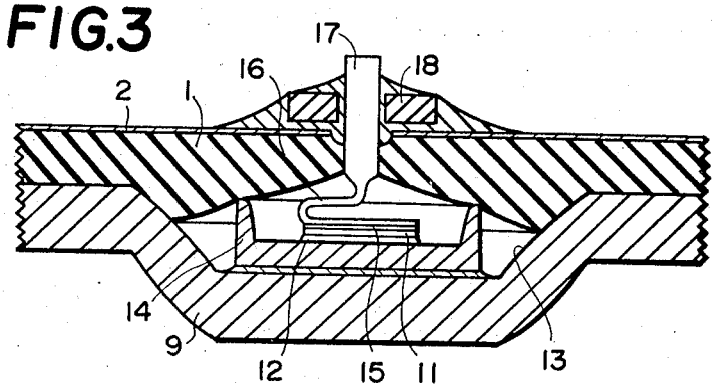
FIG. 3 is an enlarged sectional view of the assembly shown in FIG. 2 taken along a line 3—3.

As shown in FIG. 3, semiconductor rectifier elements 11 of a relatively large capacity are sandwiched between conductive plate 9 and conductive film 2. More particularly, the anode electrode 12 of each semiconductor rectifier element 11 is connected to the inner surface of a metal support 14 soldered to the bottom of a recess 13 formed in the conductive plate 9, and the cathode electrode 15 is connected to a lead wire 17 including a resilient section 16. The lead wire 17 extends to the outside through openings formed through the insulator plate 1 and the conductive film 2 and is soldered thereto together with a reinforcing ring 18. In this manner, the semiconductor rectifier element is urged against the metal support 14 by the action of the resilient section 16 so that it can resist against external mechanical vibrations and maintain good electrical connection.

Further, the conductive plate 9 is provided with two additional recesses 19 and 20 which receive therein semiconductor rectifier elements 21 and 22, respectively in the same manner as above described. Lead wires 23 and 24 of the rectifier elements 21 and 22 are soldered to the conductive films 3 and 4 respectively together with reinforcing rings 25 and 26.

In the same manner, the conductive plate 10 is formed with three recesses 27, 28 and 29 and semiconductor rectifier elements 30, 31 and 32 are received in these recesses with their anode electrodes connected to conductive films 2, 3 and 4 respectively. The anode electrodes of the rectifier elements 30, 31 and 32 are provided with lead wires 33, 34 and 35 including spring sections similar to that shown in FIG. 3. The lead wires are soldered to conductive films 2, 3 and 4, respectively, together with reinforcing rings 36, 37 and 38.

Figure 4:
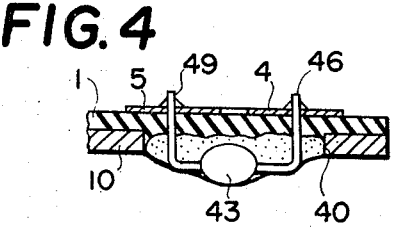
FIG. 4 is an enlarged sectional view of the assembly shown in FIG. 2, taken along a line 4—4.

The conductive plate 9 is formed with an elongated slot 39 and the conductive plate 10 with slots 40 and 41. These slots are used to receive semiconductor rectifier elements 42, 43 and 44 of relatively small current capacities. Their lead wires 45, 46 and 47 connected to the anode electrodes are connected to conductive films 2, 3 and 4, respectively, whereas the lead wires 48, 49 and 50 connected to the cathode electrodes are commonly connected to the conductive film 5. For example, the semiconductor rectifier element 43 is received in the slot 40 perforated through the conductive plate 10 and is secured in position by resin, if desired, as shown in FIG. 4. The lead wires 46 and 49 extend to the outside through the insulator plate 1 and the conductive films 4 and 5 and their projected ends are soldered to the conductive films 4 and 5.

The positive and negative DC output terminals 51 and 52 are provided at one ends of the conductive plates 9 and 10 as shown in FIG. 2, and an auxiliary DC positive output terminal 53 is formed on one end of the conductive film 5 on the side thereof opposite the positive terminal 51. The semiconductor rectifier apparatus is provided with openings 54, 55 and 56 for mounting it on the housing of the alternator, for example.

Figure 5:
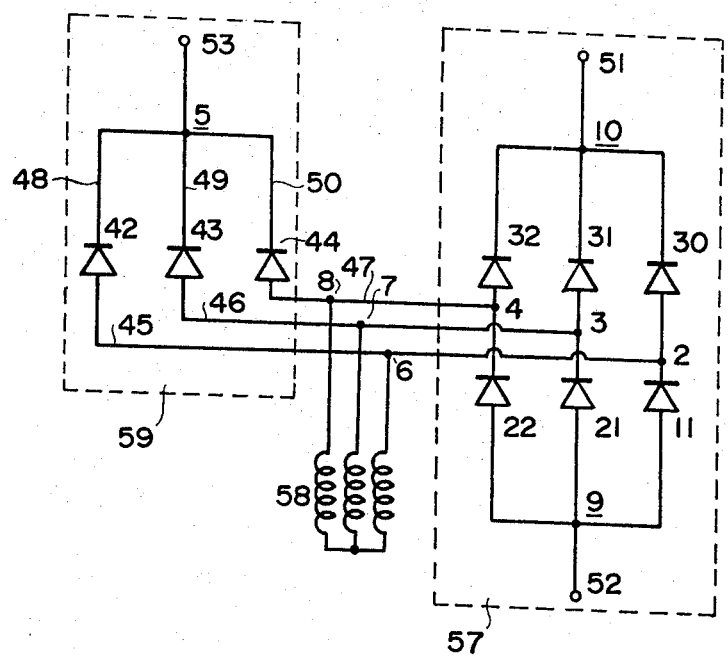
FIG. 5 is a connection diagram showing te semiconductor rectifier apparatus connected to the output terminals of an alternator.

FIG. 5 shows an electrical connection of the rectifier apparatus shown in FIGS. 1 and 2. Thus, the anode electrodes of the main semiconductor rectifier elements 11, 21 and 22 are connected to the negative terminal 52 through the conductive plate 9, while the cathode electrodes of the main semiconductor rectifier elements 30, 31 and 32 are connected to the positive terminal 51 through the conductive plate 10. The cathode electrodes and the anode electrodes of the pairs of elements 11 and 30, 21 and 31 and 22 and 32 are interconnected through conductive films 2, 3 and 4, respectively. Thus, six main rectifier elements 11, 21, 22, 30, 31 and 32 constitute a main full-wave rectifier circuit 57 of a relatively large capacity.

The AC input terminals 6, 7 and 8 provided for conductive films 2, 3 and 4, respectively, are connected to the armature winding 58 of an alternator mounted on a motorcar, for example.

The anode lead wires 45, 46 and 47 of the rectifier elements 42, 43 and 44 are connected to the conductive films 2, 3 and 4, respectively, whereas the cathode electrodes of the rectifier elements 42, 43 and 44 are commonly connected to the auxiliary output terminal 53 via the conductive film 5, thereby constituting an auxiliary rectifier circuit 59 of a relatively small current capacity. When the rectifier apparatus is mounted on a motorcar, the output terminal 51 is connected to one terminal of the storage battery, terminal 52 is grounded and terminal 53 is connected to one terminal of the field winding of the alternator.

With the construction described above, the rectifier elements occupy small volume and are well protected against mechanical shocks and vibrations. Moreover, the length of wires interconnecting the rectifier elements can be greatly reduced.

Figure 6:
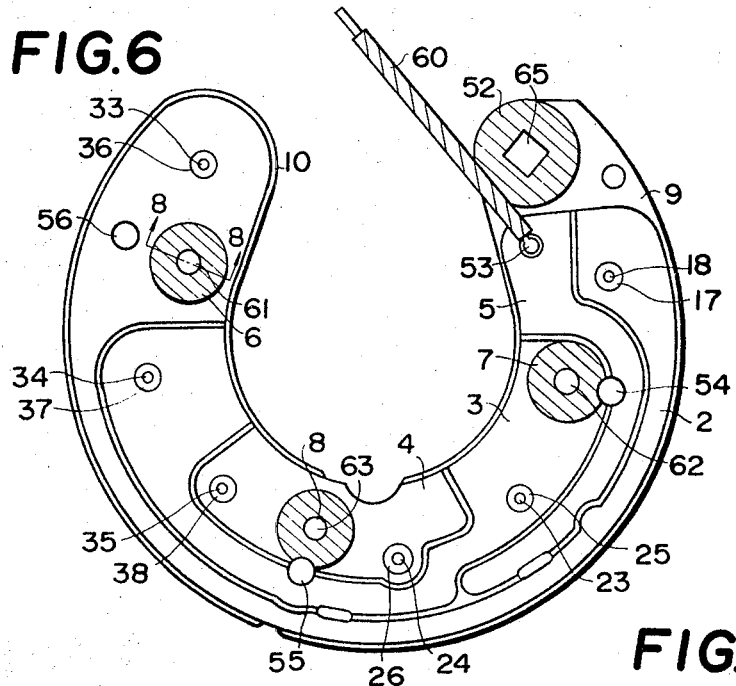
FIG. 6 shows a plan view of a modified embodiment of the invention.
Figure 8:
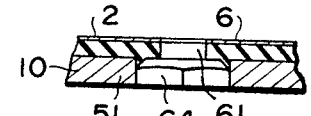
FIG. 8 is an enlarged sectional view of the assembly shown in FIG. 6 taken along a line 8—8.
Figure 7:
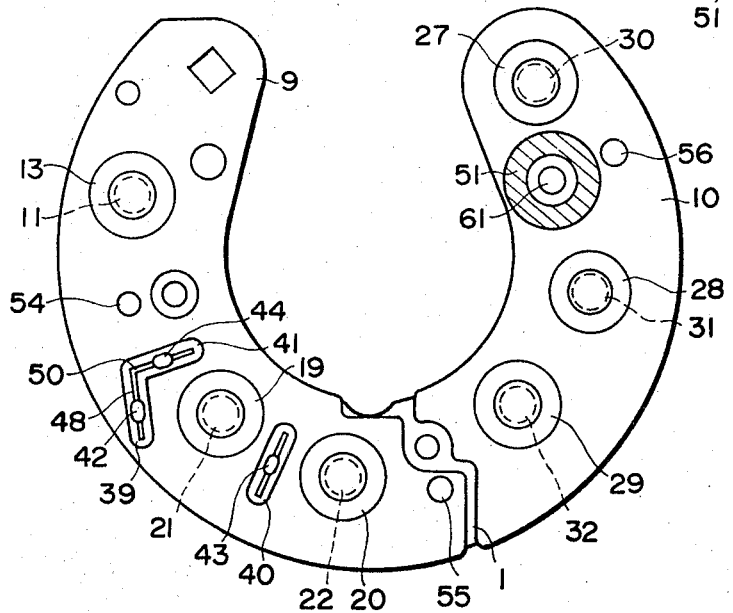
FIG. 7 is a rear view of the assembly shown in FIG. 6.

FIGS. 6, 7 and 8 illustrate a modified embodiment of this invention, in which circuit elements corresponding to those shown in FIGS. 1 through 4 are designated by the same reference numerals. In the same manner as in the previous embodiment, the main semiconductor rectifier elements 11, 21, 22, 30, 31 and 32 are connected between conductive plates 9 and 10 and conductive films, 2, 3 and 4, whereas the auxiliary semiconductor rectifier elements 42, 43 and 44 are connected between conductive films 2, 3, 4 and 5 so as to form rectifier circuits similar to those shown in FIG. 5. It will be clear that the patterns of the conductive films 2, 3, 4 and 5 are not limited to those shown in FIGS. 1 and 6 and that any suitable patterns may be used. In this embodiment, slots 39, 40 and 41 adapted to receive the auxiliary semiconductor rectifier elements 42, 43 and 44 are all formed in the conductive plate 9, of which slots 39 and 41 are connected together at one ends, and the lead wires 48 and 50 connected to the cathode electrodes of the rectifier elements 42 and 44 are passed through a common opening and are soldered to the conductive film 5. If desired, a lead wire 60 leading to the field winding of the alternator may be soldered to an output terminal provided for the conductive film 5. In this embodiment, AC input terminals 6, 7 and 8 are formed as exposed annular discs surrounding the mounting openings. For example, as shown in FIG. 8, terminal 6 is provided with an annular positive DC terminal 51 surrounding the perforation 64 and the AC input terminal 6 is formed on the conductive film 2 about mounting opening 61 concentric with perforation 64. A negative DC output terminal 52 is formed as an annular plating about a square opening 65 formed at one end of the conductive plate 9.

This modification is also suitable for use in combination with an alternator mounted on a motorcar.

What we claim is:

1. Semiconductor rectifier apparatus comprising an insulator plate; first, second and third conductive films which are formed on one surface of said insulator plate and are adapted to be connected to receive respective phase currents of a three phase alternator; first and second DC output conductive plates applied onto the other surface of said insulator plate; three pairs of main semiconductor rectifier elements mounted on said insulator plate and connected between said first, second and third conductive films and said first and second conductive plates so as to form a three phase full-wave rectifier, each one of said first and second conductive plates being formed with three circular recesses adapted to contain said three pairs of the main semiconductor rectifier elements, each rectifier element comprising one electrode carried by a metal support soldered to the bottom surface of said circular recess, a resilient lead wire connected to the other electrode extending to the outside through said insulator plate and a predetermined one of said conductive films, a reinforcing ring encircling the projected end of said lead wire, and solder means for securing said reinforcing ring to said predetermined one of said conductive films together with said projected end; a fourth conductive film formed on said one surface of said insulator plate; three solts formed in the predetermined positions of said first and second DC output conductive plates; three auxiliary semiconductor rectifier elements each having first and second lead wires, said semiconductor rectifier elements being inserted in said three solts and mounted on the other surface of said insulator plate, one ends of said lead wires being inserted through said insulator plate and connected between said fourth conductive film and said first, second and third conductive films so as to form a three phase auxiliary full-wave rectifier; the positive and negative main DC output terminals of said full-wave rectifier which are provided for said first and second conductive plates, respectively; and an auxiliary DC ouput terminal of said auxiliary full-wave rectifier which is provided for said fourth conductive film.

2. Semiconductor rectifier apparatus according to claim 1 wherein said three auxiliary semiconductor rectifier elements are mounted in said slots using an adhesive resin.

* * * * *